Aug. 16, 1966   J. D. BROOKS   3,266,514
SIGNAL SUMMING POINT DEVICE FOR HYBRID FLUID
AND ELECTRONIC CONTROLS
Filed April 20, 1964

INVENTOR.
JOHN D. BROOKS
BY
*V.C. Muller*
ATTORNEY.

United States Patent Office 3,266,514
Patented August 16, 1966

3,266,514
SIGNAL SUMMING POINT DEVICE FOR HYBRID FLUID AND ELECTRONIC CONTROLS
John D. Brooks, Alhambra, Calif., assignor to the United States of America as represented by the Secretary of the Navy
Filed Apr. 20, 1964, Ser. No. 361,623
4 Claims. (Cl. 137—81.5)

The invention described herein may be manufactured and used by or for the Government of the United States of America for governmental purposes without the payment of any royalties thereon or therefor.

This invention relates to improvements in hybrid control systems of the type combining electronic control and pure fluid control apparatuses, and more particularly to improved apparatus for combining an electrical control signal and a pure fluid control signal at a summing point in the control system.

"Pure" fluid control apparatuses are a comparatively recent addition to the control system art. They basically comprise a plurality of fluid ducts formed within substantially solid bodies of material, and their operations are characterized by no movable parts other than the stream of "working fluid" flowing through the ducts. The adjective "pure" in the phrase "pure fluid control" has reference to the fact that there are no moving parts other than the fluid, itself. The basic components of such systems are small, rugged, and inexpensive and may be combined into systems performing a variety of functions including industrial control, and built in control components for machinery.

In some instances, however, it is not possible for an entire control system to be made from pure fluid control components. One example is in connection with military homing guidance systems, where the guidance systems are typically responsive to electronic sensors such as radio apparatus or underwater sound apparatus. In these systems, a pure fluid sub-system may be employed in conjunction with an electronic sub-system, and the resultant overall system is hereinafter termed a "hybrid electronic control and pure fluid control system." For example, it has been proposed that a pure fluid autopilot sub-system be employed within the guidance and steering control servo system of a torpedo. Pure fluid control components would be ideally suited for an autopilot of a torpedo because of the availability of inexpensive fluid control elements for producing the servo follow-up signals required by an autopilot, including turn sensors and rate of turn sensors. Prior art torpedo autopilots employ intricate inertial devices such as gyroscopes, which are very costly in comparison. While the range of application of hybrid electronic and fluid control systems is extremely large, and despite the indicated potential cost saving, they have not found a scope of use as extensive as the advantages indicate. It is believed that reluctance to use hybrid systems stems to a large degree from difficulties in combining electrical control signals and fluid control signals at the summing point in a feedback system where the control input and the servo follow-up signals are summed to provide the error signal which actuates the servo. In a typical control system the input signal would be electronic, and the follow-up signal would be a fluid signal. Prior to the present invention it has been necessary to provide an intermediate conversion of the electrical signal to a fluid signal and then sum the converted fluid input signal with the fluid follow-up signal. In the prior art the intermediate conversion was performed by a pair of differentially actuating fluid valves, which were operated in response to the input signal and which in turn modulated a pair of fluid streams for delivery to a double input port fluid control device. Valving schemes of this type involve intricate design and must be manufactured with great precision. As a result the saving which was originally hoped for by use of a hybrid control system tended to be offset by the cost of the intermediate transducing arrangement.

An object of this invention is therefore to provide an improved hybrid electronic and fluid control system in which summing of electronic and fluid control signals may be performed without need for intermediate transducer components.

Another object is the provision of a device for summing an electronic signal and a fluid signal to produce a fluid output signal, which device is simple, rugged, and inexpensive to manufacture.

Other objects and many of the attendant advantages of this invention will be readily appreciated as the same becomes better understood by reference to the following detailed description when considered in connection with the accompanying drawings wherein.

Figure 1:
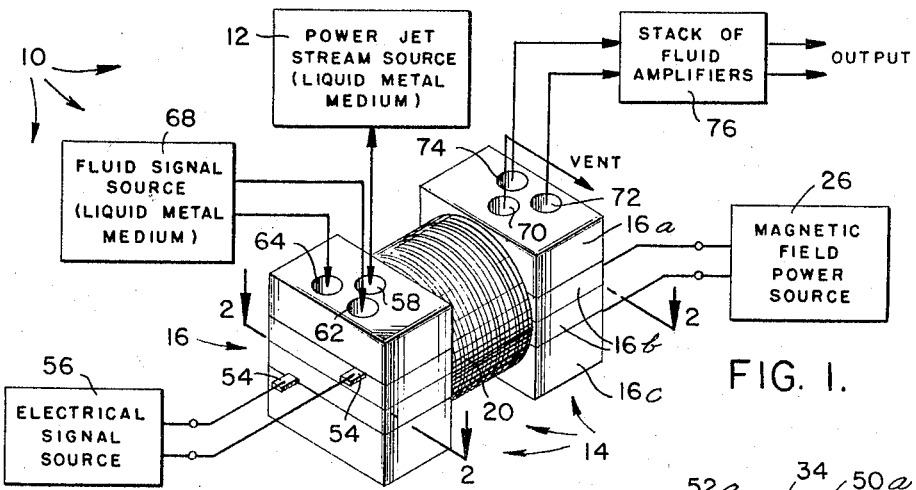
FIG. 1 is a perspective view of apparatus forming the subject of the invention, including a schematic of associated electrical and fluid control components.

Referring now to the drawing, and in particular to FIG. 1, a hybrid electronic and fluid control system 10 includes a pumping source 12 for providing a power jet stream consisting of a conductive liquid metal such as mercury, and an electrical signal and fluid signal summing device 14.

Figure 2:
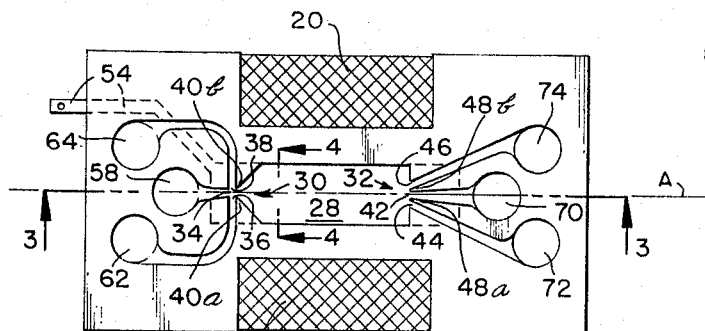
FIG. 2 is a longitudinal section taken in plane 2—2, FIG. 1.
Figure 4:
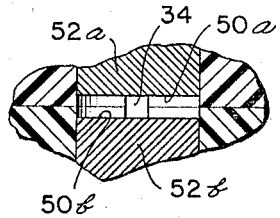
FIG. 4 is an enlarged section taken along lines 4—4 of FIG. 2.
Figure 3:
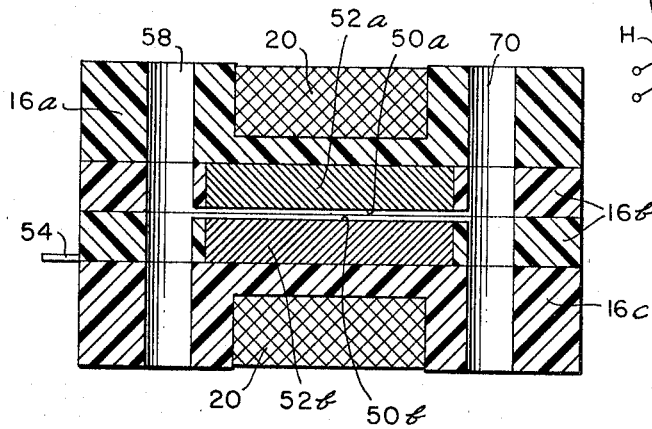
FIG. 3 is a section taken along lines 3—3 of FIG. 2.

Summing device 14 comprises a square cross section elongated rectangular body block conventionally formed from three plastic sections 16a, 16b, and 16c, FIG. 3, of molded plastic and bonded or cemented together to form an integral unit. The intermediate section 16b is itself a two-part molded unit, cemented or bonded along plane 2—2 of FIG. 1. A magnetic field generating coil 20 is disposed in an annular space centrally disposed between the ends of the block. Coil 20 is connected to conventional output terminal tabs, not shown, integrally molded in the body, and these terminals are in turn connected to a coil energizing source 26. A thin, flat, jet stream deflection chamber 28, best shown in FIGS. 3 and 4, is formed between the two parts of plastic section 16b. Chamber 28 is of a generally rectangular shape and has a major axis A aligned with the major axis of the block. One end of chamber 28 is an inlet zone 30, and the other end is an outlet zone 32. A power stream inlet orifice 34, FIGS. 2 and 4, opens into the inlet zone of chamber with the orifice axis in alignment with axis A. A pair of control stream orifices 36, 38 also opens into the inlet zone 30 with their orifice axes in transverse alignment with axis A and in confronting alignment with one another. The walls of the control inlet orifices and the walls of chamber 28 form knife edge portions 40a, 40b, which are conventional in two port fluid control components. A vent orifice 42 opens into the outlet zone with its orifice axis in alignment with axis A, and first and second output orifices 44, 46, open into outlet zone 32 at one and the other sides of the vent orifice, with conventional knife edge divider portions 48a, 48b between the vent orifice and the output orifice. Power jet inlet orifice 34, control orifices 36, 38, vent orifice 42, and output orifices 44, 46, all have square cross sections, so that the ratio of their length to width, sometimes referred to as the "aspect ratio" is equal to unity. This is best shown in FIG. 4 in connection with power jet orifice 34. The point at which the orifices open to the chamber forms the throat of jet forming nozzles in the case of the input and control orifices and the throat of the diffusion passages in the cases of the vent and output orifices. The top and bottom walls of the stream deflection chamber 50a, 50b, FIGS. 3 and 4, are formed from metal electrode plates 52a, 52b, integrally molded in the plastic body material as inserts. The inserts are connected to signal input terminal tabs 54 which in turn are connected to a source 56 providing an input signal having a variable magnitude of voltage and a variable polarity.

Figure 5:
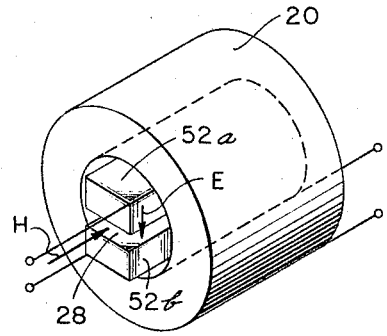
FIG. 5 is a diagrammatic perspective of certain elements of the apparatus of FIG. 1, with the body material omitted.

The coil 20 and electrodes 52a, 52b are disposed in a spacial relationship in which coil 19 surrounds the plates and the jet stream deflection chamber between the plates. This has been diagrammatically illustrated in FIG. 5. In accordance with the well known principles of the magnetic force lines associated with an annular coil, winding 20 produces an appreciable magnetic field through jet stream deflection chamber 28, in a direction parallel with axis A, as symbolically shown by arrow H, representing the direction of a magnetic force line. Application of the signal from signal source 56 across plates 52a, 52b, produce electrical potential force lines running in a direction from top wall 50a to bottom wall 50b, as symbolically shown by arrow E, representing an electric potential force line.

Power jet orifices 34 and control input orifices 36, 38 are conventionally communicated with a power jet input port 58 and a pair of fluid signal input ports 62, 64, the ports running through block 16 in its thickness direction to permit conventional communication with other passages in blocks stacked above or below block 16. Power jet source 12 is communicated to port 58, and a fluid signal input source 68 of the double port type is connected to control input ports 62 and 64. Similarly, vent orifices 42 and output orifices 44, 46 are conventionally connected to ports 70 and 72, 74, respectively. Port 70 is communicated with any suitable vent outlet and ports 72 and 74 communicate the output signal from device 14 to a stack of fluid amplifiers 76.

In operation, the power stream of liquid mercury is continuously flowed through jet stream deflection chamber 28 and the electrical signal from signal source 56 and the fluid input signal from source 68 are simultaneously applied to summing device 14. The control jets issuing from orifices 36, 38 apply a deflecting force to the jet stream tending to deflect it to one or the other of the side of axis A in the conventional manner of two input port fluid amplifiers. The perpendicular magnetic force lines, arrow H, and electric potential force lines arrow E also exert a force tending to deflect the stream toward one or the other of the sides of the axis A in accordance with the well known principle of magneto-hydrodynamic forces exerted upon a conductive liquid metal flowing through such crossed fields. The proportion of the stream deflected to one or the other of output orifices 44 or 46 will vary in accordance with the combination of forces exerted by the control stream and the crossed magnetic and electrical potential fields in a manner analogous to the function of a summing point in electronic systems. Because of the small aspect ratio of the orifices very little, if any, amplification is provided by device 14, so that the level of its output signal must be amplified by the stack of fluid amplifiers 76 in order to provide a useful output.

Obviously many modifications and variations of the present invention are possible in the light of the above teachings. It is therefore to be understood that within the scope of the appended claims the invention may be practiced otherwise than as specifically described.

What is claimed is:

1. Apparatus for modulating a fluid control system power stream with first and second control signals consisting of a variable electrical signal and a variable flow liquid stream, respectively, said apparatus comprising;
  (a) a body member forming a longitudinally extending power stream deflection passage of the type having a power stream input opening at one end for directing a power stream into said passage in a direction along its longitudinal axis, the walls of said passage at the other end of the passage forming first and second output stream openings disposed to one and the other sides of a first longitudinal reference plane through the longitudinal axis of the passage,
  (b) said deflection passage having a pair of control stream inlet openings for applying said variable flow liquid stream to the power stream to selectively deflect same to one or the other output opening, said openings being disposed in confronting alignment to one another and in perpendicular alignment to said reference plane, the improvements, in combination,
  (c) said power and control streams being of a conductive liquid medium,
  (d) means for generating a magnetic field having magnetic force lines extending through said deflection chamber in a direction essentially parallel to the longitudinal axis of the passage,
  (e) said deflection passage being formed by a pair of opposed walls made of an electrically conductive material and disposed to one and the other side of a second longitudinal reference plane perpendicular to said first reference plane, said opposed walls being adapted to receive the variable electrical signal thereacross, whereby the proportion of said power stream flowing to one and the other of said outputs openings is varied in accordance with a combination of the forces exerted upon the power stream by the control stream and the hydromagnetic force exerted by the magnetic field and the signal across the opposed walls.

2. Apparatus in accordance with claim 1, wherein
  (f) the distance between said opposed walls is small compared to the width of the passage formed thereby.

3. Apparatus in accordance with claim 1, wherein
  (g) said means for generating a magnetic field is an annular solenoid disposed about the deflection chamber and in concentric alignment with its longitudinal axis.

4. Apparatus in accordance with claim 1, wherein
  (h) said conductive liquid medium is a liquid metal.

References Cited by the Examiner
UNITED STATES PATENTS

| | | | |
|---|---|---|---|
| 2,763,125 | 9/1956 | Kadosch et al. | 137—81.5 X |
| 2,856,532 | 10/1958 | Martina | 250—49.5 |
| 2,997,013 | 8/1961 | Rice | 60—35.5 |
| 3,071,154 | 1/1963 | Cargill et al. | 137—81.5 |
| 3,145,531 | 8/1964 | Deutsch | 60—35.54 |

M. CARY NELSON, *Primary Examiner.*

S. SCOTT, *Assistant Examiner.*